United States Patent

Guhl et al.

[11] Patent Number: 5,608,641
[45] Date of Patent: Mar. 4, 1997

[54] METHOD AND APPARATUS FOR SIMPLIFYING THE TASK OF RETRIEVING AND ACCESSING A SEGMENT OF A NUMERICAL CONTROL (NC) PROGRAM

[75] Inventors: Wieland Guhl, Tacherting; Christian Rutkowski, Traunstein, both of Germany

[73] Assignee: Johannes Heidenhain GmbH, Traunreut, Germany

[21] Appl. No.: 297,506

[22] Filed: Aug. 29, 1994

[30] Foreign Application Priority Data

Aug. 30, 1993 [DE] Germany .................. 43 29 016.7

[51] Int. Cl.⁶ .................................................. G05B 19/00
[52] U.S. Cl. ................. 364/474.22; 364/191; 318/568.1
[58] Field of Search .................... 364/474.23, 474.22, 364/191, 192, 193; 318/568.1

[56] References Cited

U.S. PATENT DOCUMENTS

| | | | |
|---|---|---|---|
| 4,433,373 | 2/1984 | Miller .................................. | 364/191 X |
| 4,521,860 | 6/1985 | Kanematsu et al. ............... | 364/474.26 |
| 4,700,290 | 10/1987 | Ichikawa ......................... | 364/474.22 X |
| 4,835,700 | 5/1989 | Tanaka et al. ..................... | 364/474.23 |
| 4,890,234 | 12/1989 | Tanaka et al. ..................... | 364/474.23 |
| 4,914,599 | 4/1990 | Seki et al. ........................ | 364/474.23 X |
| 5,327,350 | 7/1994 | Endo .................................. | 364/474.21 |

OTHER PUBLICATIONS

Weisser, M., "Erfahrungen mit der Strukturierten Programmierung unter Einsatz von Columbus in Cobol; Bericht der Dresdner Bank AG, Anwendungs–Programmierung," 8th Annual Vol. of the EDV, pp. 165–182, (1979).

Eversheim, W., & Lenhart, M. (1991) Objektorientiert programmieren. *Industrie— Anzeiger,* 82, pp. 38, 41 and 42.

Balzert, Helmut (1982). *Die Entwicklung von Software–Systemen: Prinzipien, Methoden, Sprachen, Werkzeuge.* Zurich: Bibliographisches Institut AG. pp. 370–383.

Primary Examiner—Joseph Ruggiero
Attorney, Agent, or Firm—Brinks Hofer Gilson & Lione

[57] ABSTRACT

Long NC programs are made more manageable by assigning descriptive NC sentences to groups of program code lines of the NC program. The groups can be combined into groups of higher hierarchial order and assigned a descriptive NC sentence. The NC sentences are displayed in their respective hierarchial order and allow an operator to quickly locate a portion of NC program by selecting the appropriate NC sentence.

21 Claims, 2 Drawing Sheets

FIG. 2

| FIRST DISPLAY SCREEN WITH THE CODE LINES AND THE DESCRIPTIVE NC SENTENCES | | SECOND DISPLAY SCREEN WITH ONLY THE DESCRIPTIVE NC SENTENCES | |
|---|---|---|---|
| PROGRAM COURSE SENTENCE SEQUENCE | STORE PROGRAM / EDIT | | |
| 19 | CYCL DEF 11.0 MASSFAKTOR | ●BEGIN PGM HOUSING | — GROUP |
| 20 | CYCL DEF 11.1 SCL0.75 | ●TOOL - DEFINITION | |
| 21 | FN 0:01 =15999 | ●PARAMETER - ●DEFINITION | |
| 22 | ***L1: TREAT SURFACE | ●TREAT SURFACE | — SUBGROUP |
| 23 | ***L2 ROUGH DOWN | ●ROUGH DOWN | — SUBGROUP |
| 24 | TOOL CALL 2 2 8500 | ●SMOOTHING | |
| 25 | L X-97 Y-10 R0 F01 | ●DRILL IMAGE 1 | — GROUP |
| 26 | 2-31.5 R0 F01 H13 | ●CENTER | — SUBGROUP |
| 27 | L X-66 Y-5 RR F150 | ●PRE-DRILL | |
| 28 | L X-66 Y-50 RR F150 | ●DRILL | |
| 29 | L X-55 Y-55 RR F01 | ●6mm HOLES | |
| 30 | L X-50 Y-66 RR | ●10mm HOLES | |
| 31 | L X-50 Y-66 RR F150 | ●RECTANGULAR POCKET | |
| 32 | L X-55 Y-66 RR F01 | ●DRILL | |
| 33 | L X-66 Y-50 RR | ●MILL | |

| PAGE ↓ | PAGE ↑ | FIND | STRUCT INSERT | STRUCT ↓ | STRUCT ↑ | STRUCT | CHANGE WINDOW ↕ | STRUCT FK |

METHOD AND APPARATUS FOR SIMPLIFYING THE TASK OF RETRIEVING AND ACCESSING A SEGMENT OF A NUMERICAL CONTROL (NC) PROGRAM

FIELD OF THE INVENTION

The invention relates to a simplified method and apparatus for simplifying the task of locating a portion or segment of a numerical control (NC) program of interest by assigning a descriptive NC sentence to portions of the NC program, displaying the NC sentences in hierarchial order so that an operator can view the NC sentences and select one thereby retrieving and accessing the portion of the NC code assigned to the NC sentence.

BACKGROUND OF THE INVENTION

It is known in the art to provide programmable, numerically controlled (NC) processing devices of the type which include a programmable controller, a display unit coupled to the controller, means included in the controller for displaying on the display unit the NC program code lines, and an input unit, such as a keyboard, for entering programming data to the controller. In such a numerically controlled processing device, the NC program contains many lines of complex program code. Often it is desirable to edit portions of the NC program or create a NC program by copying portions of code from another NC program. However, because of the massive size and complexity of the NC program, it is often very difficult to locate quickly those portions of the code that are of interest.

SUMMARY OF THE INVENTION

According to a first aspect of the invention, there is provided a programmable, numerically controlled processing device having a controller for controlling the process device along a path determined by a NC program having a multitude of program code lines. A display unit having a display screen is coupled to the controller along with an input unit for inputting digital programming data to the controller. The controller has means for displaying on the display screen of the display unit at least a portion of the program code lines of the NC program along with a plurality of descriptive NC sentences. Each NC sentence is assigned to a starting line of code of a group of code lines combined to form a particular subject wherein the plurality of NC sentences are arranged in hierarchical order. In addition, means for selecting one of the plurality of NC sentences is included. The controller has means for displaying on the display screen of the display unit the group of program code lines assigned to the NC sentence selected.

According to a second aspect of the invention, there is provided a method for organizing a NC program having a plurality of program code lines. The method includes providing a memory for storing the NC program, a controller for retrieving the NC program stored in memory and controlling a processing device according the NC program and a display unit coupled to the controller having a display screen for displaying the NC program. The controller includes means for displaying a plurality of descriptive NC sentences wherein each NC sentence is assigned to a staring code line of a group of code lines combined to form a particular subject. The plurality of NC sentences are hierarchically ordered and arranged. Means are included for selecting one of the plurality of NC sentences. The controller includes means-for displaying on the display screen of the display unit the group of program code lines assigned to the NC sentence selected.

It is an object of the invention to improve the general arrangement and readability of NC programs by arranging an NC program in an arbitrary programming language into hierarchically ordered groups of descriptive NC sentences.

By employing this method when preparing, changing and processing such an NC program, it is possible in an advantageous manner to gain an improved general view of the momentary location in a NC program and the overall structure of the NC program. This advantage becomes particularly useful when handling long NC programs.

The invention itself, together with objects and attendant advantages, will best be understood by reference to the following detailed description taken in conjunction with the accompanying drawing. It should be understood, however, that this description is to be illustrative rather than limiting, the scope of the invention being defined by the appended claims and equivalents thereof.

BRIEF DESCRIPTION OF THE DRAWINGS

FIG. 2 illustrates a selected portion of NC program code lines along with descriptive NC sentences.

DETAILED DESCRIPTION OF THE PRESENTLY PREFERRED EMBODIMENTS

Figure 1:
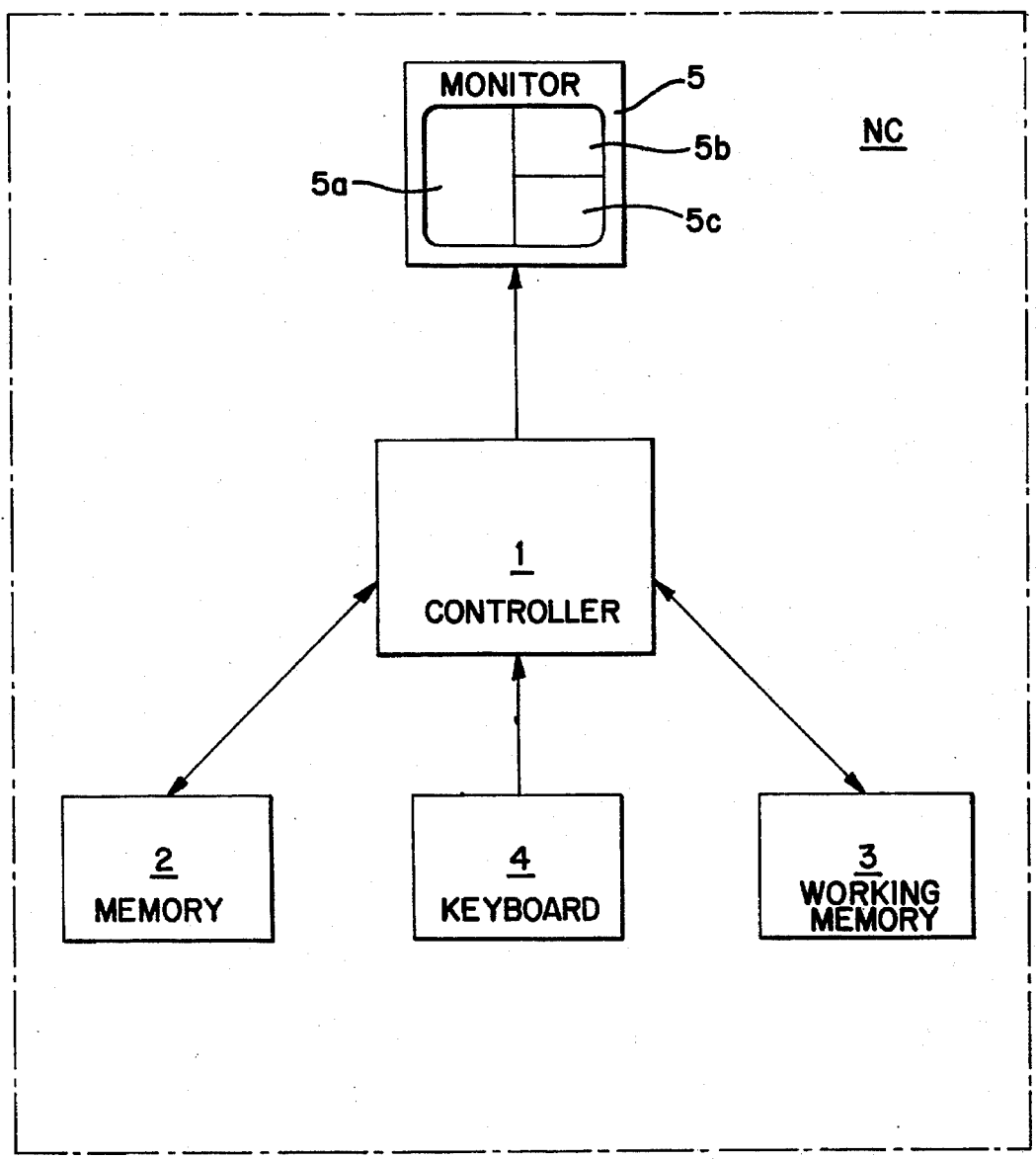
FIG. 1 illustrates the core components of the NC control portion of an NC processing device used to implement the present invention.

FIG. 1 illustrates the core components of the control portion of an NC processing device used to implement the present invention. As used herein, the term "processing device" is used in its broad sense to encompass both machine tool measuring and related equipment.

In a presently preferred embodiment, the control portion of the NC processing device includes a controller 1 which provides dialogue between the operator and the controller 1. The controller is coupled to the processing device (not shown) such as a machine tool and controls the movement of the processing device according to the NC program stored in memory. Coupled to the controller is a memory 2 for storing the NC program, a working memory 3, an input unit 4 such as a keyboard, and a display unit 5. The input unit 4 includes a plurality of input keys to allow the operator to communicate with the controller 1 and input numerical and alpha-numerical data to the controller 1. Typically, NC programs suited for path control programming are relatively complex and lengthy. Such NC programs include a multitude of complex lines of program code. According to a presently preferred embodiment of the present invention, the NC program is divided into various groups of program code as will be described in detail hereinafter. Simple descriptive NC sentences are assigned to the groups of program code. In order to make it possible to locate portions of the NC program quickly and easily, the descriptive NC sentences are also displayed on a display screen of the display unit 5, for example.

More particularly the groups of program code are classified according to subject matter. The NC sentence is assigned to the starting code line of each group and describes the subject matter of that group just as if it were a heading. The method can be continued by combining a plurality of groups into a larger group of the next higher hierarchical plane. A descriptive NC sentence is assigned to the starting code line of this larger group and describes the subject matter of this larger group. The respective hierarchical plane is indicated in this NC sentence as an additional characteristic as will be described hereinafter. In this way it is possible to form groups that are hierarchically placed on top of each other, and finally the entire NC program (the subject of which is the beginning sentence of the program) is placed on the highest hierarchical plane.

The NC sentence characterizing a subject can be advantageously designed in such a way that in other NC controls it is interpreted as a commentary within the framework of the syntax of the programming language. In this case no formal expansion of the syntax is required.

In this method all lines of program code following a descriptive NC sentence which characterizes a subject, up to the next NC sentence which characterizes a subject of the same or higher hierarchical plane, are considered as being a part of a group and of this subject.

An advantage of utilizing descriptive NC sentences that are hierarchically arranged becomes particularly clear when the NC program is displayed simultaneously in two or more display screens 5a, 5b and 5c of the display unit 5 during preparation of the program as well as editing and processing of the program. As an example, one of the screens 5a, 5b, and 5c may display the NC program as a series of program code lines. To view the entire NC program one would have to scroll the screen forward and backward by using the input unit 4. Because of the massive size and complexity of the NC program it is very difficult and time consuming to locate a particular portion of the program that is of interest in this manner. By assigning descriptive NC sentences that are hierarchically arranged to describe portions of the NC program, these NC sentences may be displayed on another display screen of the display unit 5. As previously discussed, the hierarchial plane of the NC sentence may be graphically indicated in the NC sentence itself. For example, the NC sentences may be indented, underlined or colorized to indicate its hierarchial order. Alternately, the NC sentences may be displayed in the form of a diagram. The entire arrangement of NC sentences may be displayed in one display screen of the display unit 5 or, starting with the highest hierarchical plane, only a limited number of hierarchical planes may be displayed. In the course of the movement of the cursor within the NC program, whether during editing or processing, the section of the NC program or its arrangement displayed is corrected in all windows in agreement with the display.

In place of a display unit 5 with multiple screens, an arbitrarily selected portion of code lines of a particular NC program along with the descriptive NC sentences may be displayed as illustrated in FIG. 2.

As can be seen from the diagram, the program code lines of a portion of a particular NC program are listed in the center of the table and a plurality of descriptive NC sentences are listed in the right hand column. The descriptive NC sentence "rough down" has been assigned to the starting code line of a group of program code lines which define the process of roughing down the surface of an object. The descriptive NC sentence "smoothing" has been assigned to the starting code line of a group of program code lines which define the process of smoothing the surface of an object. Since these processing methods relate to the treatment of surfaces, they are combined under the NC sentence "treat surface" and they constitute a subject, i.e., under the subject "treat surface" are located the hierarchically subordinated groups of combined NC sentences having the headings "rough down" and "smoothing" as explanatory comments.

A further example with a further hierarchical step can be found in the diagram under the subject with the heading "drill image 1". As previously described, the hierarchial plane of a NC sentence can be illustrated graphically. With reference to FIG. 2, indentations have been used to illustrate hierarchial order. Thus, the group with the heading "drill image 1" is hierarchically equivalent with the group "treat surface".

Then, within the group "drill image 1", the group of descriptive NC sentences with the headings "center", "predrill" and "drill" are provided, hierarchically subordinated to the group "drill image 1", as subordinated subjects. Within themselves they are on the same hierarchic level.

Within these sub-groups, under the subject "drill" there are again hierarchically subordinated groups of descriptive NC sentences which, on the same hierarchic level among themselves, are arranged as subjects with the headings "6 mm holes" and "10 mm holes".

With this example the advantage of the invention becomes particularly clear: if, for example, the operator wants to call up the processing cycle "center", he does not have to search laboriously through all program code lines of the NC program, instead, it is sufficient to select the heading "center" on the monitor, for example by "clicking" it by means of a cursor associated with the input unit 4. The program code lines of the NC program which are a part of the subject "center" then appear in the center column of FIG. 2.

If, however, the operator wants to locate a hierarchically lower sub-group, he can click the cursor on the subject "10 mm holes" directly, and the group of program code lines relating to drilling holes with a diameter of 10 mm will appear either in another display screen of the display unit 5 or on the same display screen as shown in FIG. 2.

It is obvious that it is possible with this method to arrange an NC program in an arbitrarily detailed manner.

The above mentioned method can be used during the preparation of new NC programs as well as for the subsequent arrangement of already existing NC programs. In the process it is possible to first determine the structure of the program with the aid of subjects described by the NC sentences when preparing new NC programs. The NC sentences for their characterization are automatically transferred into the program in the course of this. Next, the individual NC sentences within each subject are programmed. The detailed arrangement of an NC program is performed simply by adding NC sentences characterizing subjects at the desired place.

In the diagram of the arrangement of an NC program, a new subject is always automatically inserted at the end of the subject where the cursor is located, regardless of where the cursor is actually located at that moment within the subject. This is necessary so as not to change the hierarchical relations with respect to each other of momentarily blocked portions of the arrangement or of the NC program. If a subject is to be inserted at a defined place within another subject, this place must be designated in the diagram of the entire NC program.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed:

1. A programmable, numerically controlled processing device comprising:

a controller for controlling the processing device along a path determined by a NC program having a multitude of program code lines retrieved by the controller;

a display unit having a display screen coupled to the controller;

means for inputting digital programming data to the controller;

means, included in the controller, for displaying on the display screen of the display unit at least a portion of the NC program as a series of program code lines;

means, included in the controller, for displaying on the display screen of the display unit a plurality of descriptive NC sentences, wherein each descriptive NC sentence is assigned to a starting line of code of a group of code lines combined to form a particular subject, the plurality of NC sentences being arranged in hierarchical order wherein a plurality of groups of program code lines of the same hierarchical order are combined into a larger group of the next hierarchical order and assigning a descriptive NC sentence to a starting line of code of this larger group.

2. A device according to claim 1 wherein the means for inputting data comprises a keyboard input unit.

3. A device according to claim 1 wherein the means for selecting one of the plurality of sentences comprises the means for inputting.

4. A device according to claim 3 wherein the means for inputting comprises a keyboard input unit.

5. A device according to claim 1 wherein the display unit comprises a plurality of screens wherein the plurality of NC sentences are displayed on one screen while the program code lines of the NC program are displayed on another screen.

6. A simplified method of quickly accessing and displaying a segment of program code lines from a numerical control program having a multitude of program code lines, the numerical control program defining the operation and movement of a processing device wherein the segment of program code lines defines a quantifiable area of interest in the program, comprising the steps of:

providing a controller for controlling the processing device along a path according to the program code lines of the numerical control program;

providing a memory coupled to the controller for storing the multitude of code lines of the numerical control program;

providing a display unit coupled to the controller;

providing an input unit for inputting programming data to the controller;

providing means, included in the controller for displaying a plurality of descriptive NC sentences on the display unit wherein each NC sentence is associated with at least one program code line combining a plurality of groups of program code lines of the same hierarchical order into a larger group of the next hierarchical order; and assigning a descriptive NC sentence to the starting lines of codes of this larger group.

7. A method according to claim 6 wherein the step of selecting a NC sentence comprises clicking a cursor on the NC sentence.

8. A method for organizing a NC program having a plurality of program code lines comprising the steps of:

providing a memory for storing the NC program;

providing a controller for retrieving the NC program stored in memory and for controlling a processing device according to the NC program;

providing a display unit coupled to the controller having a display screen for displaying the NC program;

providing means, included in the controller, for displaying a plurality of descriptive NC sentences wherein each NC sentence is assigned to a starting code line of a group of code lines combined to form a particular subject, the plurality of NC sentences being hierarchically ordered and arranged;

providing means for selecting one of the plurality of NC sentences; and providing means, included in the controller, for displaying on the display screen of the display unit the group of program code lines assigned to the NC sentence selected.

9. A method according to claim 8 further comprising the steps of:

combining a plurality of groups of program code lines of the same hierarchical order into a larger group of the next hierarchical order; and assigning a descriptive NC sentence to the starting lines of codes of this larger group.

10. A method according to claim 8 further comprising the steps of:

combining a plurality of groups of program code lines of the same hierarchical order into larger groups of the next hierarchial order;

repeating the above until the largest group of the highest hierarchical order wherein the starting line of program code of this group is the starting line of code of the entire NC program; and assigning a descriptive NC sentence to the starting line of code of this largest group.

11. A method according to claim 6 further comprising the steps of:

combining a plurality of groups of program code lines of the same hierarchical order into larger groups of the next hierarchical order, repeating the above until the largest group of the highest hierarchical order wherein the starting line of program code of this group is the starting line of code of the entire NC program; and assigning a descriptive NC sentence to the starting line of code of this largest group.

12. A method according to claim 11 wherein the hierarchal order of the NC sentences is graphically represented.

13. A method according to claim 12 wherein the graphical representation comprises underlining the NC sentences.

14. A method according to claim 12 wherein the graphical representation comprises indenting the NC sentences.

15. A method according to claim 12 wherein the graphical representation comprises colorizing the NC sentences.

16. A method for organizing a NC program having a plurality of program code lines comprising the steps of:

providing a memory for storing the NC program;

providing a controller for retrieving the NC program stored in memory and for controlling a processing device according to the NC program;

providing a display unit coupled to the controller having a display screen for displaying the NC program;

providing means, included in the controller, for displaying a plurality of descriptive NC sentences wherein each NC sentence is assigned to a starting code line of a group of code lines combined to form a particular subject, the plurality of NC sentences being hierarchically ordered and arranged;

providing means for selecting one of the plurality of NC sentences;

providing means, included in the controller, for displaying on the display screen of the display unit the group of program code lines assigned to the NC sentence selected;

combining a plurality of groups of program code lines of the same hierarchical order into a larger group of the next hierarchical order; and assigning a descriptive NC sentence to the starting lines of codes of this larger group.

17. A method for organizing a NC program having a plurality of program code lines comprising the steps of:

providing a memory for storing the NC program;

providing a controller for retrieving the NC program stored in memory and for controlling a processing device according to the NC program;

providing a display unit coupled to the controller having a display screen for displaying the NC program;

providing means, included in the controller, for displaying a plurality of descriptive NC sentences wherein each NC sentence is assigned to a starting code line of a group of code lines combined to form a particular subject, the plurality of NC sentences being hierarchically ordered and arranged;

providing means for selecting one of the plurality of NC sentences;

providing means, included in the controller, for displaying on the display screen of the display unit the group of program code lines assigned to the NC sentence selected;

combining a plurality of groups of program code lines of the same hierarchical order into larger groups of the next hierarchical order;

repeating the above until the largest group of the highest hierarchical order wherein the starting line of program code of this group is the starting line of code of the entire NC program; and assigning a descriptive NC sentence to the starting line of code of this largest group.

18. A method according to claim 16 further comprising the steps of:

combining a plurality of groups of program code lines of the same hierarchical order into larger groups of the next hierarchical order;

repeating the above until the largest group of the highest hierarchical order wherein the starting line of program code of this group is the starting line of code of the entire NC program, and assigning a descriptive NC sentence to the starting line of code of this largest group.

19. A method according to claim 16, further comprising the steps of:

display in a first window of the display screen at least one range of the NC program as a sequence of NC-sentences (codes) with the allocated classification points (descriptive NC sentences); and simultaneously displaying in a second window of the display screen the sequence of several classification points without NC-sentences (codes).

20. A method according to claim 19, wherein the second window from the sequence of the displayed classification points one is selectable by the operator, whereupon in the first window the NC sentences (codes) are displayed which are subordinated to this classification point.

21. A method according to claim 20 wherein the step of selecting a NC sentence comprises clicking a cursor on the descriptive NC sentence.

* * * * *

UNITED STATES PATENT AND TRADEMARK OFFICE
CERTIFICATE OF CORRECTION

PATENT NO. :  5,608,641
DATED      :  Mar. 4, 1997
INVENTOR(S) :  Wieland Guhl et al.

It is certified that error appears in the above-identified patent and that said Letters Patent is hereby corrected as shown below:

<u>In the Claims</u>

In Claim 6, line 20, immediately after "line" insert --;--.

In Claim 11, line 5, replace "," with --;--.

In Claim 12, line 1, replace "hierarchal" with --hierarchical--.

In Claim 18, line 9, replace "," with --;--.

Signed and Sealed this

Sixteenth Day of June, 1998

Attest:

BRUCE LEHMAN

*Attesting Officer*    *Commissioner of Patents and Trademarks*